United States Patent [19] [11] Patent Number: 4,632,942
Ito et al. [45] Date of Patent: Dec. 30, 1986

[54] RESIN COMPOSITION FOR MASTERBATCH OF FOAMING AGENT

[75] Inventors: Ryouichi Ito; Yoshihiro Banno; Tetsuji Kakizaki, all of Mie, Japan

[73] Assignee: Mitsubishi Petrochemical Co., Ltd., Tokyo, Japan

[21] Appl. No.: 662,616

[22] Filed: Oct. 19, 1984

[30] Foreign Application Priority Data

Oct. 31, 1983 [JP] Japan ................................. 58-202509

[51] Int. Cl.⁴ .............................................. C08J 9/06
[52] U.S. Cl. ........................................ 521/92; 521/97; 521/139; 521/923; 521/79; 521/81; 525/324
[58] Field of Search .................... 521/81, 139, 79, 146, 521/143; 525/324

[56] References Cited

U.S. PATENT DOCUMENTS 2,282,002  5/1942  Scott et al. ........................... 525/324
3,709,806  1/1973  Minami et al. ......................... 521/81
3,959,189  5/1976  Kitamori .............................. 525/324

Primary Examiner—Morton Foelak
Attorney, Agent, or Firm—Oblon, Fisher, Spivak, McClelland, & Maier

[57] ABSTRACT

A resin composition for a masterbatch of foaming agent, comprising:
(A) 100 parts by weight of a resin component comprising
  (i) 100 to 20% by weight of a modified resin having an aromatic vinyl monomer unit content of 5 to 70% by weight, the aromatic vinyl monomer unit being obtained by subjecting an ethylene polymer resin or propylene polymer resin and an aromatic vinyl monomer to graft polymerization, and
  (ii) 0 to 80% by weight of an ethylene polymer resin or propylene polymer resin, and
(B) 1 to 50 parts by weight of a chemical foaming agent.

16 Claims, No Drawings

RESIN COMPOSITION FOR MASTERBATCH OF FOAMING AGENT

FIELD OF THE INVENTION

The present invention relates to a resin composition for a masterbatch of foaming agent.

BACKGROUND OF THE INVENTION

A resin component for a masterbatch of foaming agent must have a good compatibility with a matrix resin used and be kneaded uniformly in the state of not decomposing a foaming agent. It is therefore preferred that the crystalline resin component has a low melting point, the amorphous resin component has a low glass transition point and also both the crystalline and amorphous resin components have a low melt viscosity.

For example, in the case of using a polyolefin as the matrix resin, an ethylene-based resin is used as the resin component for masterbatch of foaming agent and the representative examples thereof are a high density polyethylene, a low density polyethylene, a linear low density polyethylene, an ethylene-vinyl acetate copolymer, etc.

In the case of obtaining a foamed product of styrene-based resin, a syrenic resin such as a polystyrene or an acrylonitrile-butadiene-styrene copolymer is used as the resin component for the masterbatch of foaming agent.

In addition, in the case of obtaining a foamed product of a polycarbonate, a modified polyphenylene oxide, 6-nylon, a polybutyrene terephthalate, a polyethylene terephthalate or the like, a polystyrene or an acrylonitrile-butadiene-styrene copolymer is generally used as the resin component for the masterbatch of foaming agent.

However, in particular, the masterbatch of foaming agent for a foamed product of the styrenic resin, polycarbonate, modified polyphenylene oxide, 6-nylon, polybutylene terephthalate and polyethylene terephthalate uses a styrenic resin as a base polymer thereof and, therefore, there are the following problems.

Since the melt viscosity of a polymer is high, the kneadability of a polymer is extremely poor (the melt flow index according to JIS K6870 is 30 g/10 min in the polystyrene and 33 g/10 min in the acrylonitrile-butadiene-styrene copolymer). For instance, when a polymer and a foaming agent are kneaded with an extruder to prepare a masterbatch of foaming agent, even if the kneading is conducted at a temperature sufficiently lower than the thermal decomposition temperature of the foaming agent, a heat generation by shearing occurs due to the high melt viscosity of a resin and as a result, the foaming agent is decomposed. In order to prevent this, if the kneading is conducted at a lower temperature, the screw torque remarkably increases and the rotation of screw becomes impossible. Further, even when roll or Bambury mixer is used for kneading, the heat generation by shearing becomes large and when the concentration of the foaming agent added is high, it is difficult to control decomposition of the foaming agent.

SUMMARY OF THE INVENTION

As a result of extensive investigations to develop a masterbatch of foaming agent which overcomes the above disadvantages, it has been found that by using a specific resin component, the decomposition of foaming agent during kneading is controlled to prepare a masterbatch having a high concentration of foaming agent, the masterbatch has a good compatibility with a matrix resin, and a foamed product having a good quality (e.g., uniform fine pores) can be obtained.

Accordingly, an object of the present invention is to provide a resin composition for a masterbatch of foaming agent which can overcome the disadvantages involved in the conventional masterbatches.

The resin composition for a masterbatch of foaming agent according to the present invention comprises (A) 100 parts by weight of a resin component comprising (i) 100 to 20% by weight of a modified resin having an aromatic vinyl monomer unit content of 5 to 70% by weight, the aromatic vinyl monomer unit being obtained by subjecting an ethylene polymer resin or propylene polymer resin and an aromatic vinyl monomer to graft polymerization, and (ii) 0 to 80% by weight of an ethylene polymer resin or propylene polymer resin, and (B) 1 to 50 parts by weight of a chemical foaming agent.

The composition according to the present invention has various excellent properties and is useful as a masterbatch of foaming agent to various matrix resins.

DETAILED DESCRIPTION OF THE INVENTION

The component (A) used in the present invention is obtained by subjecting an ethylene polymer or propylene polymer and an aromatic vinyl monomer to graft polymerization and is a modified resin having the aromatic vinyl monomer unit content of 5 to 70% by weight, preferably 25 to 70% by weight.

If the aromatic vinyl monomer unit content is less than 5% by weight, the improvement of the compatibility with a different type of a matrix resin cannot be expected and on the other hand, if the aromatic vinyl monomer unit content is more than 70% by weight, it is difficult to knead the foaming agent without decomposition thereof.

The ethylene polymer which can be used in the present invention includes not only a high, medium or low density ethylene polymer, but also a block, random or graft copolymer comprising a major amount (50 wt % or more) of ethylene and other monomer.

Examples of the other monomer include a vinyl ester (e.g., vinyl acetate), an unsaturated organic acid or its derivative (e.g., acrylic acid, maleic anhydride, methyl acrylate, ethyl acrylate, butyl acrylate, methyl methacrylate, a metal salt of acrylic acid or a metal salt of methacrylic acid), α-olefin (e.g., propylene, butene-1, pentene-1, 4-methylpentene-1, hexene-1, heptene-1 or octene-1), and so forth.

Of those ethylene polymers, a low density polyethylene, a high density polyethylene, a linear low density polyethylene, an ethylene-vinyl acetate copolymer and an ethylene-ethyl acrylate copolymer are preferred.

The propylene polymer which can be used in the present invention includes not only a propylene homopolymer, but also a copolymer of a major amount (50 wt % or more) of propylene and an α-olefin other than propylene, such as ethylene, butene-1, pentene-1, 4-methylpentene-1 or hexene-1.

Of those propylene polymers, a propylene homopolymer and a propylene-ethylene copolymer are preferred.

The propylene polymer is a crystalline, resinous material.

Examples of the aromatic vinyl monomer which can be used include styrene, methylstyrene and α-methylstyrene. In particular, when styrene is used, the molecular weight of a slight amount of a polystyrene by-produced outside the styrene graft chain can be reduced by selecting the polymerization conditions. Thus, use of styrene is preferred.

The aromatic vinyl monomer can be used in combination with, for example, an unsaturated organic acid ester. In particular, when a long chain acrylate such as n-butyl acrylate or 2-ethylhexyl acrylate is concurrently used, the glass transition point of the modified resin can be decreased.

The conventional method such as melt grafting, solution grafting, suspension grafting, radiation grafting or gas-phase grafting can be employed as the graft polymerization. The preferred method is, for example, as follows.

An aqueous suspension containing 30 to 95% by weight of an ethylene polymer particle or propylene polymer particle, 70 to 5% by weight of an aromatic vinyl monomer and 0.01 to 5 parts by weight, per 100 parts by weight of the aromatic vinyl monomer, of a radical polymerization initiator having a decomposition temperature for obtaining a half-life period of 10 hours of 50° to 150° C. is heated under the condition such that the decomposition of the initiator does not substantially occur so that the aromatic vinyl monomer is impregnated into the ethylene polymer or propylene polymer particles and the amount of the free aromatic vinyl monomer becomes less than 20% by weight, and the temperature of the aqueous suspension is then increased to complete polymerization of the aromatic vinyl monomer.

The modified resin thus-obtained has a melt flow rate (MFR, according to JIS K6758) of 0.1 to 400 g/10 min, preferably 20 to 200 g/10 min. If the MFR is less than 0.1/10 min, the heat generation by shearing of the resin becomes large and the decomposition of the foaming agent is difficult to control. On the other hand, if the MFR is more than 400/10 min, the modified resin is not uniformly dispersed in the matrix resin and the mechanical strength of the foamed product obtained deteriorates.

The most preferred modified resin is a styrene modified ethylene-vinyl acetate copolymer.

The ethylene polymer resin or propylene polymer resin as the second component in Component (A) can be appropriately selected from the materials for the modified resin described above. The resin is preferably used in the form of a powder so as to uniformly decompose the foaming agent.

The chemical foaming agent used as Component (B) in the present invention is a material having a decomposition temperature of 140° C. or more. Examples of the chemical foaming agent include azodicarbonamide, dinitrosopentamethylene tetramine, 4,4'-oxybisbenzenesulfonyl hydrazide, a mixture of $NaHCO_3$ and monosodium citrate, and a mixture of $NaHCO_3$ and trisodium citrate. Of those foaming agents, azodicarbonamide, a mixture of $NaHCO_3$ and monosodium citrate and a mixture of $NaHCO_3$ and trisodium citrate are preferred from easily handling.

The mixing proportions of the components used in the present invention are (A) 100 parts by weight of the resin component comprising 100 to 20% by weight, preferably 100 to 40% by weight, of the modified resin and 0 to 80% by weight, preferably 0 to 60% by weight, of the ethylene polymer resin or propylene polymer resin, and (B) 1 to 50 parts by weight, preferably 3 to 30 parts by weight, of the chemical foaming agent.

If the amount of the modified resin is less than 20% by weight, the kneadability of the foaming agent and the compatibility with the different matrix resin are not sufficient.

If the amount of the chemical foaming agent is less than 1 part by weight, such a composition is not suitable as a masterbatch and a good foaming cannot be obtained. On the other hand, if the amount thereof is more than 50 parts by weight, such a composition is also not suitable as a masterbatch.

The composition according to the present invention may contain various dispersing agents such as a decomposition temperature controlling agent of foaming agent, a cell controlling agent, a nucleating agent, a pigment, an antioxidant, a weather resistant agent, an antistatic agent, plasticizer, a flame retardant and the like.

The masterbatch composition according to the present invention provides a good effect when the matrix resin is polystyrene, acrylonitrile-butadiene-styrene copolymer, polycarbonate, modified polyphenylene oxide, polyphenylene oxide, acrylonitrile-styrene resin, 6-nylon, 6,6-nylon, polybutylene terephthalate and polyethylene terephthalate.

Particularly great effect can be obtained when the matrix resin is polyphenylene oxide and modified polyphenylene oxide (e.g., polyphenylene oxide containing a styrenic polymer).

The present invention will now be explained in more detail by reference to the following Examples and Comparative Examples, but is not limited thereto. Unless otherwise indicated, all percents, parts, ratios and the like are all by weight.

EXAMPLE 1

100 parts of powders having an average particle diameter of about 80 μm prepared by freeze-pulverizing a modified polymer which was prepared by graft polymerizing 50% of a styrene monomer onto an ethylene-vinyl acetate copolymer having MFR (measured according to JIS K6760) of 80 g/10 min and 20 parts of azodicarbonamide were dry blended with a supermixer and the resulting blend was kneaded and extruded with a 40 mm extruder to obtain a masterbatch of foaming agent. The kneading and extrusion conditions were cylinder temperature: 105° to 130° C., die temperature: 130° C. and number of revolutions of screw: 50 rpm.

The cylinder temperature did not increase, it was possible to control the decomposition of the foaming agent and the electric current of the screw motor was within the normal operation range of 10 to 11 A. Further, the masterbatch could be easily produced.

COMPARATIVE EXAMPLE 1

Using 100 parts of powders having an average particle diameter of about 80 μm prepared by freeze-pulverizing a polystyrene having MFR (measured according to JIS K6870) of 30 g/10 min and 20 parts of azodicarbonamide, a masterbatch of foaming agent was prepared in the same manner as in Example 1.

As a result, the screw torque was large, the amount of the electric current of screw motor exceeded the specified value and a smooth production was impossible.

Further, the similar results were obtained even when the number of revolutions of screw was decreased to 10 rpm.

EXAMPLE 2

100 parts of powders prepared by dry blending 60% of the modified polymer powders as used in Example 1 and 40% of a low density polyethylene having MFR of 40 g/10 min and an average particle diameter of about 150 μm with a supermixer and each of 10, 20 and 30 parts of azodicarbonamide were blended and using each blend, a masterbatch of foaming agent was prepared in the same manner as in Example 1.

In each case, the masterbatch could be prepared without decomposition of the foaming agent. Further, dispersion of azodicarbonamide in the resulting masterbatch was good.

REFERENCE EXAMPLE 1

A material prepared by adding 4 parts of the masterbatch containing 20 parts of azodicarbonamide as obtained in Example 2 above to 100 parts of a polystyrene having MFR (measured according to JIS K6870) of 23 g/10 min was injection molded with a low degree of foaming.

The shape of the product obtained was a length of 230 mm, a width of 50 mm and a thickness of 10 mm. The molding conditions were molding temperature: 220° C., injection pressure: 600 kg/cm$^2$, injection rate: 1 sec/shot and mold temperature: 50° C.

The foamed product obtained had a density of 0.720 g/cm$^3$, uniform fine pores and a good appearance.

REFERENCE EXAMPLE 2

A material prepared by adding 3 parts of the masterbatch containing 20 parts of azodicarbonamide as obtained in Example 2 above to 100 parts of a polystyrene having MFR (measured according to JIS K6870) of 2.2 g/10 min was extruded using a 50 mm extruder to prepare a sheet.

The sheet thus obtained had a width of 300 mm and a thickness of 1.7 mm. The molding conditions were molding temperature: 215° C., number of revolutions of screw: 90 rpm and winding speed: 80 cm/min.

The foamed sheet had a density of 0.44 g/cm$^3$, uniform fine pores and a good appearance.

COMPARATIVE EXAMPLE 2

Using 100 parts of powders prepared by dry blending 60% of polystyrene powders as used in Comparative Example 1 and 40% of a low density polyethylene having MFR of 40 g/10 min and an average particle diameter of about 150 μm and each of 10, 20 and 30 parts of azodicarbonamide as a foaming agent, a masterbatch was prepared under the conditions of cylinder temperature: 120°–160° C., die temperature: 150° C. and number of revolutions of screw: 30 rpm.

When the amount of the foaming agent was 10 parts, a slightly foamed masterbatch (density: 0.670 g/cm$^3$) was obtained.

When the amounts of the foaming agent were 20 and 30 parts, the shear heat generation was large and the degree of foaming in the masterbatch was large.

Thus, in any amounts of the foaming agent, a good masterbatch could not be obtained.

COMPARATIVE REFERENCE EXAMPLE 1

Using a material prepared by adding 5 parts of the masterbatch for foaming agent containing 10 parts of azodicarbonamide obtained in Comparative Example 2 above to 100 parts of the polystyrene as used in Reference Example 1 above, an injection moding was conducted with a low degree of foaming.

The foamed product thus-obtained had a density of 0.860 g/cm$^3$, delamination occurred on the surface and the appearance was poor.

EXAMPLE 3

A mixture of 100 parts of powders having an average particle diameter of about 105 μm prepared by freeze-pulverizing a modified polymer which was prepared by graft polymerizing 50% of styrene onto an ethylene-propylene random copolymer having MFR (measured according to JIS K6758) of 50 g/10 min and an ethylene content of 3% was dry blended with a supermixer, and the resulting blend was kneaded and granulated with a 40 mm extruder to prepare a masterbatch.

The kneading conditions were cylinder temperature: 145°–165° C., die temperature: 160° C. and number of revolutions of screw: 50 rpm.

A good masterbatch without no decomposition of the foaming agent could be obtained.

REFERENCE EXAMPLE 3

Using a material prepared by adding 4 parts of the masterbatch as obtained in Example 3 above to 100 parts of an ethylene-propylene block copolymer having MFR (measured according to JIS K6758) of 6 g/10 min, an injection molding with a low degree of foaming was conducted.

The molding conditions were molding temperature: 230° C., injection pressure: 600 kg/cm$^2$, injection rate: 1 sec/shot and mold temperature: 40° C.

The foamed product thus-obtained had a density of 0.744 g/cm$^3$, uniform fine pores and a good appearance.

EXAMPLE 4

A mixture of 100 parts of powders having an average particle diameter of about 95 μm prepared by freeze-pulverizing a modified polymer which was obtained by graft polymerizing 50% of a styrene monomer onto a low density polyethylene having MFR (measured according to JIS K6760) of 40 g/10 min and 20 parts of a foaming agent ("HYDROCEROL", a product of Mitsubishi Yuka Fine Co.) which is a mixture of monosodium citrate and NaHCO$_3$ (molar ratio 1:3) was dry blended with a supermixer and the resulting blend was kneaded and granulated with a 40 mm extruder to prepare a masterbatch of foaming agent.

The kneading conditions were cylinder temperature: 90°–110° C., die temperature: 125° C. and number of revolutions of screw: 50 rpm.

A good masterbatch of foaming agent without decomposition of the foaming agent could be obtained.

REFERENCE EXAMPLE 4

Using a material prepared by adding 4 parts of the masterbatch obtained in Example 4 above to 100 parts of a modified polyphenylene oxide ("FN 215", a product of General Electric Co.), an injection molding with a low degree of foaming was conducted.

The molding conditions were molding temperature: 240° C., injection pressure: 800 kg/cm², injection rate: 1 sec/shot and mold temperature: 60° C.

The foamed product obtained had a density of 0.915 g/cm³, uniform fine pores and a good appearance.

EXAMPLE 5

A mixture of 100 parts of powders having an average particle diameter of about 95 μm prepared by graft polymerizing 50% of a styrene monomer onto a low density polyethylene having MFR (measured according to JIS K6760) of 40 g/10 min and 20 parts of the foaming agent ("HYDROCEROL") as used in Example 4 above was dry blended using a supermixer and the resulting blend was kneaded and granulated with a 40 mm extruder to prepare a masterbatch of foaming agent.

The kneading conditions were cylinder temperature: 90°–110° C., die temperature: 125° C. and number of revolutions of screw: 50 rpm.

A good masterbatch without decomposition of the foaming agent could be obtained.

REFERENCE EXAMPLE 5

Using a material prepared by adding 4 parts of the masterbatch obtained in Example 5 above to 100 parts of an ethylene-propylene block copolymer having MFR (measured according to JIS K6758) of 6 g/10 min and an ethylene content of 7%, an injection molding with a low degree of foaming was conducted.

The molding conditions were molding temperature: 210° C., injection pressure: 600 kg/cm², injection rate: 1 sec/shot and mold temperature: 40° C.

The foamed product obtained had a density of 0.715 g/cm³, the pores were finer than the pores in the foamed product obtained in Example 3 and the product had almost no swirl mark on the surface.

REFERENCE EXAMPLE 6

Using a material prepared by adding 4 parts of the masterbatch obtained in Example 5 above to 100 parts of a polypropylene having a flame retardancy (flame retardant rating: UL94 V-2) which was prepared by adding 3 parts of bis(2,3-dibromopropyl)ether of tetrabromobisphenol A and 1.5 parts of $Sb_2O_3$ to 100 parts of an ethylene-propylene block copolymer having MFR (measured according to JIS K6758) of 30 g/10 min and an ethylene content of 4%, an injection molding with a low degree of foaming was conducted.

The molding conditions were the same as in Reference Example 5.

The foamed product obtained had a density of 0.809 g/cm³, uniform fine pores and a good appearance.

While the invention has been described in detail and with reference to specific embodiments thereof, it will be apparent to one skilled in the art that various changes and modifications can be made therein without departing from the spirit and scope thereof.

What is claimed is:

1. A foam molding material comprising a resin composition for a masterbatch of foaming agent, comprising:
   (A) 100 parts by weight of a resin component comprising
   (i) 100 to 20% by weight of a modified resin having an aromatic vinyl monomer unit content of 5 to 70% by weight, said aromatic vinyl monomer unit being obtained by subjecting an ethylene polymer resin or propylene polymer resin and an aromatic vinyl monomer to graft polymerization, and
   (ii) 0 to 80% by weight of an ethylene polymer resin or propylene polymer resin, and
   (B) 1 to 50 parts by weight of a chemical foaming agent and a matrix resin selected from the group consisting of polystyrene, acrylonitrile-butadiene-styrene copolymer, polycarbonate, modified polyphenylene oxide, polyphenylene oxide, acrylonitrile-styrene resin, 6-nylon, 6,6-nylon, polybutylene terephthalate and polyethylene terephthalate.

2. The foam molding material of claim 1, wherein the aromatic vinyl monomer unit content is 25 to 70% by weight.

3. The foam molding material of claim 1, wherein the ethylene polymer is selected from the group consisting of a low density polyethylene, a high density polyethylene, a linear low density polyethylene, an ethylene-vinyl acetate copolymer and an ethylene-ethyl acrylate copolymer.

4. The foam molding material of claim 1, wherein the propylene polymer is selected from the group consisting of a propylene homopolymer and a propylene-ethylene copolymer.

5. The foam molding material of claim 1, wherein the aromatic vinyl monomer is styrene.

6. The foam molding material of claim 1, wherein the aromatic vinyl monomer is used in combination with an unsaturated organic acid ester.

7. The foam molding material of claim 6, wherein the unsaturated organic acid ester is selected from the group consisting of n-butyl acrylate and 2-ethylhexyl acrylate.

8. The foam molding material of claim 1, wherein the graft polymerization is conducted by the manner such that a suspension containing 30 to 95% by weight of the ethylene polymer particle or propylene polymer particle, 70 to 5% by weight of the aromatic vinyl monomer and 0.01 to 5 parts by weight, per 100 parts by weight, of a radical polymerization initiator having a decomposition temperature for obtaining a half-life period of 10 hours of 50° to 150° C. is heated under the conditions such that the decomposition of the initiator does not substantially occur so that the aromatic vinyl monomer is impregnated into the ethylene polymer or propylene polymer particles and the amount of the free aromatic vinyl monomer becomes less than 20% by weight, and the temperature of the aqueous suspension is then increased to complete polymerization of the aromatic vinyl monomer.

9. The foam molding material of claim 1, wherein the modified resin has a melt flow rate of 0.1 to 400 g/10 min.

10. The foam molding material of claim 9, wherein the melt flow rate is 20 to 200 g/10 min.

11. The foam molding material of claim 1, wherein the modified resin is a styrene modified ethylene-vinyl acetate copolymer.

12. The foam molding material of claim 1, wherein the ethylene polymer resin or propylene polymer resin is used in the form of a powder.

13. The foam molding material of claim 1, wherein the chemical foaming agent has a decomposition temperature of 140° C. or more.

14. The foam molding material of claim 1, wherein the chemical foaming agent is selected from the group consisting of azodicarbonamide, a mixture of $NaHCO_3$ and monosodium citrate and a mixture of NaHCO₃ and trisodium citrate.

15. The foam molding material of claim 1, wherein the amount of the modified resin is 40 to 100% by weight, the amount of the ethylene polymer resin or propylene polymer resin is 0 to 60% by weight and the amount of the chemical foaming agent is 3 to 30 parts by weight per 100 parts by weight of the modified resin.

16. The foam molding material of claim 1, wherein the matrix resin is polyphenylene oxide or modified polyphenylene oxide.

* * * * *

UNITED STATES PATENT AND TRADEMARK OFFICE
CERTIFICATE OF CORRECTION

PATENT NO. : 4,632,942
DATED : December 30, 1986
INVENTOR(S) : RYOUICHI ITO ET AL It is certified that error appears in the above-identified patent and that said Letters Patent is hereby corrected as shown below:

In column 6, lines 51-52, "Mitsubishi Yuka Fine Co." should read: --Boehringer Ingelheim KG--.

Signed and Sealed this

Sixth Day of June, 1989

Attest:

DONALD J. QUIGG

Attesting Officer

Commissioner of Patents and Trademarks